US010047198B2

(12) United States Patent
Surgenor et al.

(10) Patent No.: US 10,047,198 B2
(45) Date of Patent: Aug. 14, 2018

(54) TELOMERISATION OF CYCLIC POLYORGANOSILOXANES

(71) Applicant: Dow Corning Corporation, Midland, MI (US)

(72) Inventors: Avril Surgenor, Waterloo (BE); Richard Taylor, Penarth (GB); Marek Cypryk, Lodz (PL)

(73) Assignee: Dow Silicones Corporation, Midland, MI (US)

( * ) Notice: Subject to any disclaimer, the term of this patent is extended or adjusted under 35 U.S.C. 154(b) by 301 days.

(21) Appl. No.: 14/900,218

(22) PCT Filed: Jun. 20, 2014

(86) PCT No.: PCT/US2014/043313
§ 371 (c)(1),
(2) Date: Dec. 21, 2015

(87) PCT Pub. No.: WO2015/009398
PCT Pub. Date: Jan. 22, 2015

(65) Prior Publication Data
US 2016/0145395 A1    May 26, 2016

(30) Foreign Application Priority Data

Jul. 15, 2013 (PL) ........................................ 404691

(51) Int. Cl.
C08G 77/04 (2006.01)
C08G 77/08 (2006.01)
C08G 77/18 (2006.01)

(52) U.S. Cl.
CPC ........... *C08G 77/045* (2013.01); *C08G 77/08* (2013.01); *C08G 77/18* (2013.01)

(58) Field of Classification Search
None
See application file for complete search history.

(56) References Cited

U.S. PATENT DOCUMENTS

| | | | |
|---|---|---|---|
| 2,909,549 | A | 10/1959 | Bailey et al. |
| 3,161,614 | A | 12/1964 | Brown et al. |
| 3,686,253 | A | 8/1972 | Bennett et al. |
| 4,079,098 | A | 3/1978 | Rossmy et al. |
| 4,461,867 | A | 7/1984 | Surprenant |
| 5,068,383 | A | 11/1991 | Bourgoin et al. |
| 5,519,158 | A | 5/1996 | Evans |
| 8,461,274 | B2 | 6/2013 | Gatti et al. |
| 2006/0241271 | A1 | 10/2006 | Rubinsztajn et al. |

FOREIGN PATENT DOCUMENTS

JP          9012720     1/1997

OTHER PUBLICATIONS

CN10170195 DERWENT abstract, 2008, 2 pages.*
Scibiorek, et. al., "Cationic Telomerization of Hexamethylcyclotrisiloxane (D3) With Silanes Containing Alkoxy, Aryloxy and acyloxy Functions Bound to Silicon", European Polymer Journal, 1981, pp. 413-419, vol. 17, Pergamon Press Ltd., Great Britain.
Zavin, et. al., "The Anionic Oligomerization of Hexamethylcyclotrisiloxane With Methylmethoxysilanes", European Polymer Journal, 1985, pp. 135-140, vol. 21, Pergamon Press Ltd., Great Britain.
Cypryk, et. al., "Kinetics of the condensation of oligosiloxanes containing acetoxyl and hydroxyl end groups catalyzed by uncharged nucleophiles in an acid-base inert solvent", Journal of Organometallic Chemistry, 1989, pp. 197-204, vol. 377, Elsevier Sequoia S.A., Lausanne, Netherlands.
Rubinsztajn, et. al., "Condensation of model linear siloxane oligomers possessing silanol and silyl chloride end groups. The mechanism of silanol silylation by chlorosilane in the presence of neutral nucleophiles", Journal of Organometallic Chemistry, 1989, pp. 27-37, vol. 367, Elsevier Sequoia S.A., Lausanne, Netherlands.
Rozga-Wijas, et. al., "Polysiloxane-silica hybrids from novel precursors by the sol-gel process", Journal of Materials Chemistry, 2005, pp. 2383-2392, vol. 15, The Royal Society of Chemistry.
Search Report from corresponding Chinese 2014800390941 application.
Zavin, B.G., "The Anionic Oligomerization of Hexamethylcyclotrisiloxane with Methylmethoxysilanes", Eur. Polym. Journal, 1985, p. 135-140, vol. 21, No. 2.
List of Publications from First Office Action from corresponding Japanese Patent Application 2016-527999, dated Apr. 16, 2018.

* cited by examiner

*Primary Examiner* — Clinton A Brooks
(74) *Attorney, Agent, or Firm* — Catherine U. Brown

(57) ABSTRACT

A telomerization process is used to prepare a reaction product containing a noncyclic hydrocarbonoxy-functional polyorganosiloxane. The process includes heating a composition including (A) a cyclic polyorganosiloxane, (B) a silane, and (C) a Lewis Acid telomerization catalyst. The cyclic polyorganosiloxane has formula $[(R^1_2SiO)_{2/2}]_n$, where subscript n is an integer of 4 or more, and each $R^1$ is independently H, a hydrocarbyl group, or a halogenated hydrocarbyl group. The silane has formula $R^2_{(4-m)}Si(OR^3)_m$, where subscript m is an integer from 1 to 4, each $R^2$ is independently H, a hydrocarbyl group, or a halogenated hydrocarbyl group, and each $R^3$ is independently a hydrocarbyl group. The telomerization catalyst is a Lewis Acid of formula $[M]^{x+}[R^4SO_3^-]_x$ where M is a metal atom selected from Aluminum (Al), Bismuth (Bi), Cerium (Ce), Chromium (Cr), Iron (Fe), Gallium (Ga), Indium (In), Lanthanum (La), Scandium (Sc), Samarium (Sm), and Ytterbium (Yb); $R^4$ is selected from an oxygen atom (O) and $CF_3$; and x represents a number up to a maximum valence of the metal atom selected for M.

11 Claims, No Drawings

TELOMERISATION OF CYCLIC POLYORGANOSILOXANES

CROSS REFERENCE TO RELATED APPLICATIONS

This application is a U.S. national stage filing under 35 U.S.C. § 371 of PCT Application No. PCT/US14/043313 filed on 20 Jun. 2014, currently pending, which claims the benefit of Poland Patent Application No. 404691 filed 15 Jul. 2013 under 35 U.S.C. § 119 (a)-(d) and 35 U.S.C. § 365(a). PCT Application No. PCT/US14/043313 and Poland Patent Application No. 404691 are hereby incorporated by reference.

Condensation reaction curable polyorganosiloxane compositions contain alkoxy-functional polyorganosiloxanes, such as methoxy-terminated polydiorganosiloxanes, as base polymers, Hexamethylcyclotrisiloxane (D3) and 2,4,6-trimethyl-2,4,6-trivinylcyclotrisiloxane (V3) have been telomerised with tetramethoxysilane (TMOS) in the presence of trifluoromethane sulfonic acid to produce methoxy-functional polyorganosiloxanes. The term 'telomerisation' and its derivatives, such as 'telomerise,' telomerising' and 'telomerised,' refer to the formation of a polymer by a reaction in which a chain transfer limits the length of the polymer ('telomer') produced. However, cyclosiloxanes having four or more silicon atoms in the ring have been difficult to telomerise due to unfavorable reaction kinetics. A process for telomerising cyclosiloxanes having four or more silicon atoms in the ring to produce a hydrocarbonoxy-functional polyorganosiloxane is desired in the organosilicon industry.

BRIEF SUMMARY OF THE INVENTION

A telomerisation process produces a reaction product comprising a noncyclic hydrocarbonoxy-functional polyorganosiloxane. The telomerisation process comprises: heating a composition comprising (A) a cyclic polyorganosiloxane of formula $[(R^1_2SiO)_{2/2}]_n$, where subscript n is an integer of 4 or more, and each $R^1$ is independently H, a hydrocarbyl group, or a halogenated hydrocarbyl group;

(B) a silane of formula $R^2_{(4-m)}Si(OR^3)_m$, where subscript m is an integer from 1 to 4, each $R^2$ is independently H, a hydrocarbyl group, or a halogenated hydrocarbyl group, and each $R^3$ is independently a hydrocarbyl group;

(C) a Lewis Acid telomerisation catalyst of formula $[M]^{X+}[R^4SO_3^-]_X$, where M is a metal atom selected from Aluminum (Al), Bismuth (Bi). Cerium (Ce), Chromium (Cr), Iron (Fe), Gallium (Ga), Indium (In), Lanthanum (La), Scandium (Sc), Samarium (Sm), and Ytterbium (Yb); $R^4$ is selected from an oxygen atom (O) and $CF_3$, and x represents a number up to a maximum valence of the metal atom selected for M.

DETAILED DESCRIPTION OF THE INVENTION

A telomerisation process produces a reaction product comprising a noncyclic hydrocarbonoxy-functional polyorganosiloxane, such as an alkoxy-functional polydiorganosiloxane. The telomerisation process comprises:
(1) heating a composition comprising:
(A) a cyclic polyorganosiloxane of formula $[(R^1_2SiO)_{2/2}]_n$, where subscript n is an integer of 4 or more, and each $R^1$ is independently a H, a hydrocarbyl group, or a halogenated hydrocarbyl group;

(B) a silane of formula $R^2_{(4-m)}Si(OR^3)_m$, where subscript m is an integer from 1 to 4, each $R^2$ is independently H, a hydrocarbyl group, or a halogenated hydrocarbyl group, and each $R^3$ is independently a hydrocarbyl group;

(C) a Lewis Acid telomerisation catalyst of formula $[M]^{X+}[R^4SO_3^-]_X$, where M is a metal atom selected from Aluminum (Al), Bismuth (Bi), Cerium (Ce), Chromium (Cr), Iron (Fe), Gallium (Ga), Indium (In), Lanthanum (La), Scandium (Sc), Samarium (Sm), and Ytterbium (Yb); $R^4$ is selected from an oxygen atom (O) and $CF_3$, and x represents a number up to the maximum valence of the metal atom selected for M; and Optionally (D) a solvent; and
Optionally (E) a proton scavenger.

The process may optionally further comprise (2) adding water before, during, and/or after step (1). The process may optionally further comprise (3) recovering the noncyclic hydrocarbonoxy-functional polyorganosiloxane. Step (3) may be present, for example, when the solvent is used, and the solvent is removed from the hydrocarbonoxy-functional polyorganosiloxane product and/or when a side product is formed, and the hydrocarbonoxy-functional polyorganosiloxane and side product are separated from one another. The side product may be, for example, a cyclic polyorganosiloxane that differs from ingredient (A).

The telomerisation process produces a reaction product comprising a noncyclic hydrocarbonoxy-functional polyorganosiloxane. The noncyclic hydrocarbonoxy-functional polyorganosiloxane may be linear or branched. Alternatively, the noncyclic hydrocarbonoxy-functional polyorganosiloxane may be linear. The hydrocarbonoxy-functional polyorganosiloxane may comprise units of formulae: $[(R^3O)_b R^1_{(3-b)}SiO]_{1/2}$, $[(R^3O)R^1SiO]_{2/2}$, $(R^1_2SiO)_{2/2}$, and $[(R^3O)_b R^1_{(3-b)}SiO]_{3/2}$, where each subscript b is independently 1 to 3, and $R^1$ and $R^3$ are as described above. Alternatively, the hydrocarbonoxy-functional polyorganosiloxane may have formula: $(R^3O)_b R^1_{(3-b)}SiO—(R^1_2SiO)_c—Si(OR^3)_d R^1_{(3-d)}$, where subscript b, $R^1$, and $R^3$ are as described above, subscript d is 1 to 3, and subscript c has a value sufficient to provide the hydrocarbonoxy-functional polyorganosiloxane with a molecular weight (Mn) of 500 to 5,000; alternatively 1,000 to 5,000. Alternatively, when subscript m is 4 in the formula for the silane, then subscript b may be 3 and subscript d may be 1. Alternatively, when subscript m is 2 in the formula for the silane, then subscript b may be 1 and subscript d may be 1.

Ingredient (A) in the composition is a cyclic polyorganosiloxane of formula $[(R^1_2SiO)_{2/2}]_n$, where each $R^1$ is independently H, a hydrocarbyl group, or a halogenated hydrocarbyl group and subscript n is an integer of 4 or more. Alternatively, n may be 4 to 6, alternatively 4 to 5. Suitable hydrocarbyl groups are exemplified by alkyl, alkenyl, alkynyl carbocyclic, aryl, and aralkyl groups as described below. Alternatively, each $R^1$ may be independently selected from H, alkyl, alkenyl aryl, and aralkyl. Alternatively, each $R^1$ may be an alkyl group, such as Me or Et or an alkenyl group such as Vi; alternatively each $R^1$ may be Me or Vi; alternatively each $R^1$ may be Me. Examples of cyclic polyorganosiloxanes include octamethylcyclotetrasiloxane (D4), decamethylcyclopentasiloxane (D5), and dodecamethylcyclohexasiloxane (D6); alternatively a mixture comprising two or more of D4, D5, and D6; and alternatively ingredient (A) may be D4.

Ingredient (B) is a silane of formula $R^2_{(4-m)}Si(OR^3)_m$, where subscript m is an integer from 1 to 4, alternatively 2 or 4, and alternatively 2. Each $R^2$ is independently H or a hydrocarbyl group, or a halogenated hydrocarbyl group, that may be the same as, or different from, $R^1$. Each $R^3$ is independently a hydrocarbyl group that may be the same as, or different from, the hydrocarbyl group described above for $R^1$. Examples of silanes suitable for use as ingredient (B) include, but are not limited to, dimethyldimethoxysilane, methytrimethoxysilane, dimethyldiethoxysilane, diethyldimethoxysilane, methylethyldimethoxysilane, dimethyldiethoxysilane, and combinations thereof. Alternatively, dimethyldimethoxysilane, dimethyldiethoxysilane, or a combination thereof may be used as ingredient (B). Alternatively, ingredient (B) may be dimethyldiethoxysilane.

Ingredients (A) and (B) are present in the composition in amounts such that the composition contains equivalent molar amounts of ingredients (A) and (B) or a molar excess of cyclic polyorganosiloxane as compared to the molar amount of silane, or a molar excess of silane as compared to the molar amount of cyclic polyorganosiloxane. Alternatively, the mole ratio of cyclic polyorganosiloxane/silane (A/B Ratio) may be at least 0.25/1; alternatively 0.25/1 to 10/1, and alternatively 1/1 to 4/1.

Ingredient (C) is a Lewis Acid telomerisation catalyst of formula (i) $[M]^{x+}[R^4SO_3^-]_x$ where M is a metal atom selected from Aluminum (Al), Bismuth (Bi), Cerium (Ce), Chromium (Cr), Iron (Fe), Gallium (Ga), Indium (In), Lanthanum (La), Scandium (Sc), Samarium (Sm), and Ytterbium (Yb); $R^4$ is selected from an oxygen atom (O) and $CF_3$; and x represents a number up to the maximum valence of the metal atom selected for M. Alternatively, x is 2 to 3; alternatively x=3. Alternatively, M is selected from Bi, Fe, Ga, and Sc; alternatively M is Bi, Fe, or Ga; alternatively M is Bi, Fe, or Sc; alternatively M is Bi or Fe; alternatively M is Fe, Ga, or Sc; alternatively, M is Fe or Ga; and alternatively M is Fe. Alternatively, $R^4$ is O. Examples of suitable metal sulfate catalysts (where, in formula (i), $R^4$ is O) include $Cr_2(SO_4)_3$ and $Fe_2(SO_4)_3$. Alternatively, formula (i) may represent a metal triflate; i.e., in formula (i) $R^4$ is $CF_3$. Examples of suitable metal triflate catalysts include Aluminum(III) trifluoromethane sulfonate $Al(OTf)_3$, Bismuth(III) trifluoromethane sulfonate $Bi(OTf)_3$, Cerium(III) trifluoromethane sulfonate $Ce(OTf)_3$, iron(III) trifluoromethane sulfonate $Fe(OTf)_3$, Gallium(III) trifluoromethane sulfonate $Ga(OTf)_3$, Indium(III) trifluoromethane sulfonate $In(OTf)_3$, Lanthanum(III) trifluoromethane sulfonate $La(OTf)_3$, Scandium(III) trifluoromethane sulfonate $Sc(OTf)_3$, Samarium(III) trifluoromethane sulfonate $Sm(OTf)_3$, and Ytterbium(III) trifluoromethane sulfonate $Yb(OTf)_3$. Alternatively, the metal triflate catalyst may be Bismuth(III) trifluoromethane sulfonate, Gallium(III) trifluoromethane sulfonate, Iron(III) trifluoromethane sulfonate, or Scandium(III) trifluoromethane sulfonate. Compounds of formula (i) are commercially available. For example, $Al(OTf)_3$, $Bi(OTf)_3$, $Ce(OTf)_3$, $Fe(OTf)_3$, $In(OTf)_3$, $La(OTf)_3$, $Sc(OTf)_3$, $Sm(OTf)_3$, $Yb(OTf)_3$, $Cr_2(SO_4)_3$, and $Fe_2(SO_4)_3$ are each available from Sigma-Aldrich, Inc., of St. Louis, Mo., USA.

The amount of ingredient (C) present in the composition will depend on various factors including the type and amount of cyclic polyorganosiloxane selected for ingredient (A), the type and amount of silane selected for ingredient (B), and the type of Lewis Acid selected for ingredient (C). However, the amount of ingredient (C) may be at least 0.1 mol %, alternatively at least 1 mol %, alternatively 0.1 mol % to 20 mol %, alternatively 1 mol % to 10 mol % and alternatively 2 mol % to 5 mol %, based on the combined amounts of ingredients (A), (B), and (C).

The composition may further comprise one or more additional ingredients. Additional ingredients may be selected from (D) a solvent, (E) a proton scavenger, (F) water, and two or more of ingredients (D), (E), and (F). Alternatively, the additional ingredients may be selected from (D), (F), and both of (D) and (F). Alternatively, the additional ingredient may be water. The water may be added to the composition before, during, and/or after step (1).

Ingredient (D) is a solvent. The solvent is a polar organic solvent such as chloroform, bromoform, trichloroethane, dibromobenzene, fluorotoluene, methylbutylether, tetrahydrofuran, dichlorodiethylether, acetonitrile, propionitrile, butyronitrile, valeronitrile, benzonitrile, cyclohexonitrile, capronitrile, succinonitrile, ethoxyacetylene, pyridine, nitromethane, nitroethane, nitropropane, nitrooctane, nitrobenzene, formamide, acetamide, dimethylformamide, dimethylacetamide, tetramethylurea, ethycarbamate, and mixtures of two or more thereof. Alternatively, the solvent may be acetonitrile or benzonitrile; alternatively acetonitrile. The amount of solvent, when present, may be 5% to 25% based on the combined weights of ingredients (A) and (B). However, without wishing to be bound by theory, it is thought that solvent may shift the equilibrium of the reaction unfavorably, i.e., to produce more cyclic than noncyclic polyorganosiloxanes. Furthermore, use of solvent may increase the number of process steps to remove the solvent and recover the noncyclic hydrocarbonoxy-functional polyorganosiloxane from the reaction product. Therefore, in one embodiment, the process is solventless, i.e., heating the composition comprising ingredients (A), (B), and (C), is performed neat; without solvent. Alternatively, the amounts of ingredients (A), (B), and (C) may total 100% based on the weight of the composition in step (1).

Ingredient (E) is a proton scavenger. The proton scavenger may be a pyridine compound.

Ingredient (F) is water. Water may be added before step (1), during step (1), and/or after step (1). For example, water may be combined with the catalyst and thereafter mixed with ingredients (A) and (B) before or during heating in step (1). The amount of water may be 0 to 200 moles, alternatively 0 to 100 moles, alternatively 0 to 50 moles, alternatively 0 to at least 1 mole of water based on the molar amount of the silane selected for ingredient (B). Alternatively, the amount of water may be 0.25 mole to 0.75 mole, alternatively 0.5 mole, based on the molar amount of the silane selected for ingredient (B). The amount of water added may depend on when the water is added in the process; for example, a portion of the water may be added before and/or during step (1), such as 0.25 to 1 mole of water based on the molar amount of the silane selected for ingredient (B). When water will be added after step (1), then the amount of water added may be higher, such as 1 mole to 200 moles, based on the molar amount of the silane selected for ingredient (B).

Step (1) of the process described above may be performed by any convenient means, such as heating the container, such as using a heated batch stirred tank, or by placing the container in an oven, or by putting a container on a hot plate. Heating may be performed at 80° C. to the boiling point of the silane selected for ingredient (B), alternatively 80° C. to 150° C., alternatively 80° C. to 120° C., alternatively 80° C. to 100° C., and alternatively 100° C. to 120° C. Pressure in step (1) is not critical, and step (1) may be performed at ambient or elevated pressure. Step (1) is performed for a time sufficient to form the noncyclic hydrocarbonoxy-functional polyorganosiloxane. The exact time will depend on various factors including the temperature and types and amounts of ingredients (A), (B), and (C), however the time for step (1) may be at least 60 minutes; alternatively at least 100 minutes; alternatively 100 minutes to 15,000 minutes; alternatively 100 minutes to 1,100 minutes.

Without wishing to be bound by theory, it is thought that the process described herein provides the benefit of producing a noncyclic hydrocarbonoxy-functional polyorganosiloxane with a content of D4≤0.2% and/or a content of other cyclic polyorganosiloxanes (e.g., D5 and/or D6)≤0.1%, depending on the specific catalyst selected for ingredient (C) and the reaction time. Without wishing to be bound by theory, it is thought that the process may be performed until the amount of ingredient (A), and any amount of cyclic side products are so low that the noncyclic hydrocarbonoxy-functional polyorganosiloxane product may be produced without a separate recovery step, e.g., without stripping or distillation.

EXAMPLES

In the examples herein, "D3" means hexamethyltrisiloxane, "D4" means octamethylcyclotetrasiloxane, "D5" means decamethylcyclopentasiloxane, and "D6" means dodecamethylcyclohexasiloxane, "DMDES" means dimethyl diethoxysilane; "Fe(OTf)3" means Iron(III) trifluoromethane sulfonate; "Mn" means number average molecular weight, and "$C_{16}$" means an alkane with 16 carbon atoms used as an internal standard for the GC analysis of the reactor effluent in the examples. The $C_{16}$ was added after reaction to quantify the GC results.

In the examples below, the general procedure for preparing samples was as follows. The reaction was carried out in a 25 mL Schlenk tube equipped with a magnetic stir bar under an inert atmosphere of dry argon. A catalyst was placed in the tube, and then all other ingredients were added to the tube and mixed together. The tube was placed in oil bath for heating to a given temperature with continuous stirring. The reaction progress was followed by GC.

In the examples, cyclic polyorganosiloxane for ingredient (A) was D4. The silane for ingredient (B) was DMDES. The catalyst for ingredient (C) was Fe(OTf)3. Unless otherwise indicated, the amounts of ingredients (A) and (B) were sufficient to provide a molar ratio of D4/DMDES of 1, 2, or 4. The amount of ingredient (C) was 1 mol % to 5 mol % based on the amount of D4. The reaction was carried out in bulk, without solvent. In some experiments, a controlled amount of water was added (50 mol % relative to the amount catalyst) to determine the effect of water on the proportions of reaction products. For some samples, a post reaction hydrolysis was performed by adding up to 1 mole $H_2O$ per mole of silane. $C_{16}$ was used in amount of ca. 1/3 mol/mol relative to the amount of D4.

In Example 1, samples were prepared as described above. The amounts of each ingredient are shown below in Table 1. The amount of catalyst (weight %) relative to D4 was 2%, and the total sample weight was 1.356 g. The results are in Table 2.

TABLE 1

| Reactant | Amount [mmol] |
|---|---|
| D4 | 3.21 |
| DMDES | 1.57 |
| $C_{16}$ | 0.65 |
| Fe(OTf)$_3$ | 0.0389 |
| $H_2O$ | 0.0195 |

TABLE 2

Telomerisation Results of D4 with DMDES (2/1) in Bulk at a Temp. of 80° C.

| Time (min) | Conversion of D4 (%) | Conversion of DMDES (%) | D4 (mol/kg) | DMDES (mol/kg) | D3 (mol/kg) | D5 (mol/kg) | D6 (mol/kg) |
|---|---|---|---|---|---|---|---|
| 0 | 0.0 | 0.0 | 2.3723 | 1.1666 | 0.0000 | 0.0000 | 0.0000 |
| 100 | 50.5 | 95.9 | 1.1733 | 0.0700 | 0.0052 | 0.0358 | 0.0035 |
| 120 | (addition of $H_2O$) | | 0.5000 | 0.0850 | 0.0040 | 0.0460 | 0.0090 |
| 180 | 93.7 | 95.0 | 0.1501 | 0.0584 | 0.0029 | 0.0586 | 0.0149 |
| 1210 | 98.8 | 96.1 | 0.0292 | 0.0450 | 0.0034 | 0.0238 | 0.0130 |
| 2660 | 99.6 | 97.3 | 0.0104 | 0.0316 | 0.0029 | 0.0085 | 0.0093 |

In Example 2 samples were prepared as described above. The amounts of each ingredient are shown below in Table 2. The results are in Table 2.

TABLE 2

Collection of the results for telomerisations catalysed by Fe(OTf)3

| Sample | Temp (° C.) | D4:DMDES (A/B Ratio) | Catalyst | max D4 Conversion (%) | Time (min) | Mn |
|---|---|---|---|---|---|---|
| 1 | 20 | 1/1 | 1% | 95.9 | 5560 | n.a. |
| 2 | 50 | 1/1 | 1% | 96 | 1490 | 1100 |
| 3 | 80 | 1/1 | 1% | 97.5 | 1830 | 2000 |
| 4 | 80 | 2/1 | 1% | 98.7 | 1410 | 3000 |
| 5 | 100 | 1/2 | 1% | 95.9 | 5745 | <1000 |
| 6 | 100 | 1/4 | 1% | 95.4 | 2840 | <1000 |
| 7 | 100 | 2/1 | 1% | 99.8 | 1140 | 2250 |
| 8 | 100 | 2/1 | 1% | 98.3 | 1480 | 2600 |
| 9 | 100 | 2/1 | 1% | 99.8 | 2580 | 2600 |
| 10 | 100 | 4/1 | 1% | 96.2 | 1390 | 4400 |
| 11 | 100 | 2/1 | 1% | 97.7 | 1680 | 2600 |
| 12* | 100 | 2/1 | 1% | 99.8 | 1345 | 6000 |
| 13 | 50 | 1/1 | 2% | 94.4 | 1400 | 1000 |
| 14 | 80 | 1/1 | 2% | 99.8 | 1385 | 1200 |
| 15 | 80 | 2/1 | 2% | 99.2 | 1398 | 2700/30900 |
| 16 | 80 | 2/1 | 2% | 99.8 | 9960 | n.a. |
| 17* | 80 | 2/1 | 2% | 99.0 | 1355 | 3400 |
| 18** | 80 | 2/1 | 2% | 50.5 (99.6) | 120 (2660) | n.a. |
| 19** | 80 | 2/1 | 2% | 99.7 (99.8) | 1925 (8160) | n.a. |

TABLE 2-continued

Collection of the results for telomerisations catalysed by Fe(OTf)3

| Sample | Temp (° C.) | D4:DMDES (A/B Ratio) | Catalyst | max D4 Conversion (%) | Time (min) | Mn |
|---|---|---|---|---|---|---|
| 20 | 80 | 4/1 | 2% | 93.7 | 1425 | 15600 |
| 21** | 100 | 1/1 | 2% | 99.4 | 1345 | 3300/20400 |
| 22 | 100 | 4/1 | 2% | 99.7 | 1320 | 10100 |
| 23 | 120 | 1/1 | 2% | 96.3 | 1360 | 1200 |
| 24 | 150 | 1/1 | 2% | 95.3 | 1320 | 840 |
| 25 | 50 | 1/1 | 5% | 93.8 | 402 | 1000 |
| 26 | 50 | 1/1 | 5% | 89.1 | 1320 | 1000 |
| 27 | 60 | 1/1 | 5% | 93.8 | 1320 | 1500 |
| 28 | 80 | 1/1 | 5% | 96.4 | 1420 | 3200 |
| 29 | 100 | 1/1 | 5% | 95.9 | 1120 | <1000 |
| 30 | 120 | 1/1 | 5% | 93.7 | 985 | 3000 |

In Table 2, n.a. means not applicable or that the value was not measured, * designates that water (0.5 mol/mol catalyst) was added to the catalyst at the beginning of the reaction, and ** designates that water (0.5 mol/mol catalyst) added after reaction, and two numbers are given in "D4 Conversion" column. The first means conversion, at which water was added, and the other (in parentheses) is conversion at which the reaction was stopped, and the corresponding times are given in the "Time" column.

In example 3, the process of example 2 was repeated, except that different catalysts were used. The conditions and results are below in Table 3.

TABLE 3

Collection of the results for telomerisations catalysed by different metal telomerisation catalysts

| Sample | Time (min) | Temp (° C.) | D4:DMDES (A/B Ratio) | Catalyst and amount | Max D4 Conversion (%) | Mn |
|---|---|---|---|---|---|---|
| 1 | 11000 | 100 | 1/1 | $Fe_2(SO_4)_3$ 5% | 85 | n.a. |
| 2** | 1820 (7175) | 100 | 1/1 | $Yb(OTf)_3$ 5% | 7 (96) | n.a. |
| 3 | 5750 | 100 | 1/1 | $Fe_2(SO_4)_3$ 2% | 73 | n.a. |
| 4** | 5550 (9900) | 100 | 1/1 | $Yb(OTf)_3$ 5% | 95.5 (98) | 2550 |
| 5 | 8400 | 100 | 1/1 | $Sc(OTf)_3$ 5% | 99.6 | n.a. |
| 6 | 5500 | 100 | 1/1 | $Ga(OTf)_3$ 5% | 98.8 | 2250 |
| 7 | 5600 | 100 | 1/1 | $Sm(OTf)_3$ 5% | 53 | n.a. |
| 8 | 1400 | 100 | 1/1 | $Bi(OTf)_3$ 5% | 95 | n.a. |
| 9 | 1200 | 100 | 1/1 | $In(OTf)_3$ 5% | 92 | 1750 |
| 10 | 2700 | 100 | 1/1 | $Al(OTf)_3$ 5% | 95 | 1800 |
| 11 | 4100 | 100 | 1/1 | $Sc(OTf)_3$ 2% | 98.8 | 1650 |
| 12 | 11500 | 80 | 1/1 | $Sc(OTf)_3$ 2% | 28 | n.a. |
| 13 | 4100 | 100 | 2/1 | $Sc(OTf)_3$ 2% | 90.5 | n.a. |
| 14 | 12900 | 100 | 4/1 | $Sc(OTf)_3$ 2% | 99.8 | n.a. |
| 15 | 5700 | 100 | 1/1 | $Ga(OTf)_3$ 2% | 97.8 | n.a. |

In Table 3, n.a. means not applicable or that the value was not measured, and ** indicates that water (0.5 mol/mol catalyst) was added after reaction. Where two numbers are given in the "D4 Conversion" column: the first means conversion, at which water was added, and the other (in parentheses) is conversion at which the reaction was stopped; the corresponding times are given in the "Time" column.

In example 4, the process described above in example 1 was repeated, except different metal compounds were tested to determine their catalytic activity toward telomerisation.

TABLE 4

Comparison of catalysts for telomerisation of $D_4$ + DMDES in bulk

| Compound Screened | Best $D_4$ conversion (%) | Experiment |
|---|---|---|
| $Al(OTf)_3$ | 95 | 4-1 |
| $Ga(OTf)_3$ | 99 | 4-2 |
| $In(OTf)_3$ | 92 | 4-3 |
| $Bi(OTf)_3$ | >99 | 4-4 |
| $Cr_2(SO_4)_3$ | 53 | 4-5 |
| $Fe(OTf)_3$ | >99 | 4-6* |
| $Fe(OTf)_3$ | >99 | 4-7 |
| $Fe(NO_3)_3$ | 35 | 4-8 |
| $Fe_2(SO_4)_3$ | 98 | 4-9 |
| $FeSO_4$ | 9 | 4-10 |
| $Sc(OTf)_3$ | >99 | 4-11 |
| $La(OTf)_3$ | 11 | 4-12 |
| $Ce(OTf)_3$ | 98 | 4-13 |
| $Sm(OTf)_3$ | 53 | 4-14 |
| $Yb(OTf)_3$ | 96 | 4-15 |

*Denotes that in this experiment, D5 was used instead of D4 as the starting material for ingredient (A).

These examples show that certain Lewis Acids are useful as telomerisation catalysts for cyclic polyorganosiloxanes having 4 or more silicon atoms per molecule.

The summary, abstract, and claims are hereby incorporated by reference. All amounts, ratios, and percentages are by weight, unless otherwise indicated by the context of the specification. The articles 'a', 'an', and 'the' each refer to one or more, unless otherwise indicated by the context of the specification. The following abbreviations have these meanings herein: "Me" means methyl, "Et" means ethyl, "Pr" means propyl and includes n-propyl and isopropyl, "Bu" means butyl and includes n-butyl, iso-butyl, t-butyl and sec-butyl, "Vi" means vinyl, "GC" means gas chromatography, "Mn" means number average molecular weight, "mL" means milliliters, and "OTf" means trifluoromethane sulfonate or triflate.

"Alkyl" means an acyclic, branched or unbranched, saturated monovalent hydrocarbyl group. Alkyl is exemplified by, but not limited to, Me, Et, Pr (e.g., iso-propyl and/or n-propyl), Bu (e.g., isobutyl, n-butyl, tert-butyl, and/or sec-butyl), pentyl (e.g., isopentyl, neopentyl, and/or tert-pentyl), hexyl, heptyl, octyl, nonyl, decyl, undecyl, and dodecyl as well as branched saturated monovalent hydrocarbyl groups of 6 to 12 carbon atoms. Alkyl groups may have 1 to 30 carbon atoms, alternatively 1 to 24 carbon atoms, alternatively 1 to 20 carbon atoms, alternatively 1 to 12 carbon atoms, alternatively 1 to 10 carbon atoms, alternatively 1 to 6 carbon atoms, and alternatively 1 to 4 carbon atoms.

"Alkenyl" means an acyclic, branched or unbranched, monovalent hydrocarbyl group having one or more carbon-carbon double bonds. Alkenyl is exemplified by, but not limited to, vinyl, allyl, propenyl, and hexenyl. Alkenyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms.

"Alkynyl" means an acyclic, branched or unbranched, monovalent hydrocarbyl group having one or more carbon-carbon triple bonds. Alkynyl is exemplified by, but not limited to, ethynyl, propynyl, and butynyl. Alkynyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms.

"Aryl" means a cyclic, fully unsaturated, hydrocarbyl group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Carbocycle" and "carbocyclic" each mean a hydrocarbyl ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl.

"Halogenated hydrocarbyl" means a hydrocarbyl where one or more hydrogen atoms bonded to a carbon atom have been formally replaced with a halogen atom. Halogenated hydrocarbyl groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include allyl chloride.

The disclosure of ranges includes the range itself and also anything subsumed therein, as well as endpoints. For example, disclosure of a range of 80 to 150 includes not only the range of 80 to 150, but also 105, 145, 100, 110, and 125 individually, as well as any other number subsumed in the range. Furthermore, disclosure of a range of, for example, 80 to 150 includes the subsets of, for example, 95 to 105, 103 to 117, 105 to 145, and 140 to 150, as well as any other subset subsumed in the range.

With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination with any other member or members of the group, and each member provides adequate support for specific embodiments within the scope of the appended claims. For example, disclosure of the Markush group: alkyl, aryl, and aralkyl includes the member alkyl individually; the subgroup alkyl and aryl; and any other individual member and subgroup subsumed therein.

The subject matter of all combinations of independent and dependent claims, both singly and multiply dependent, is expressly contemplated but is not described in detail for the sake of brevity. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A process for preparing a reaction product comprising a noncyclic hydrocarbonoxy-functional polyorganosiloxane comprises:
   (1) heating a composition comprising:
      (A) a cyclic polyorganosiloxane of formula $[(R^1_2SiO)_{2/2}]_n$, where subscript n is an integer of 4 or more, and each $R^1$ is independently H, a hydrocarbyl group, or a halogenated hydrocarbyl group;
      (B) a silane of formula $R^2_{(4-m)}Si(OR^3)_m$, where subscript m is an integer from 1 to 4, each $R^2$ is independently H, a hydrocarbyl group, or a halogenated hydrocarbyl group, and each $R^3$ is independently a hydrocarbyl group; and
      (C) a Lewis Acid telomerisation catalyst of formula $[M]^{x+}[R^4SO_3^-]_x$ where M is a metal atom selected from Aluminum (Al), Bismuth (Bi), Cerium (Ce), Chromium (Cr), Iron (Fe), Gallium (Ga), Indium (In), Lanthanum (La), Scandium (Sc), Samarium (Sm), and Ytterbium (Yb); $R^4$ is O or $CF_3$; and x represents a number up to a maximum valence of the metal atom selected for M.

2. The process of claim 1, further comprising adding to the composition an ingredient selected from (D) a solvent, (E) a proton scavenger, and both (D) and (E).

3. The process of claim 1, further comprising: (2) adding water before, during, and/or after step (1).

4. The process of claim 1, where heating is at a temperature of 80° C. to 150° C. for a time sufficient to form the noncyclic hydrocarbonoxy-functional polyorganosiloxane.

5. The process of claim 1, where $R^1$ is selected from H, a hydrocarbyl group selected from alkyl, alkenyl, aryl, and aralkyl; and a halogenated hydrocarbyl group; and subscript n is 4 to 6.

6. The process of claim 1, where $R^2$ is selected from H, a hydrocarbyl group selected from alkyl, alkenyl, aryl, and aralkyl; and a halogenated hydrocarbyl group; subscript m is 2 to 4; and $R^3$ is alkyl.

7. The process of claim 1, where ingredients (A) and (B) are present in amounts such that molar ratio of (A)/(B) is at least 0.25/1.

8. The process of claim 1, where ingredient (C) is a metal triflate of formula $[M]^{x+}[CF_3SO_3^-]_x$ where M is a metal atom selected from Aluminum (Al), Bismuth (Bi), Iron (Fe), Gallium (Ga), Indium (In), Scandium (Sc), Samarium (Sm), and Ytterbium (Yb).

9. The process of claim 8, where M is Al, Bi, Fe, Ga, or Sc; and subscript x is 3.

10. The process of claim 1, where ingredient (C) is a metal sulfate selected from $Cr_2(SO_4)_3$ and $Fe_2(SO_4)_3$.

11. The process of claim 1, where ingredient (C) is present in an amount from 2 mol % to 5 mol % based on combined weights of ingredients (A), (B), and (C).

\* \* \* \* \*